United States Patent
Trimeche et al.

(10) Patent No.: US 7,940,311 B2
(45) Date of Patent: May 10, 2011

(54) MULTI-EXPOSURE PATTERN FOR ENHANCING DYNAMIC RANGE OF IMAGES

(75) Inventors: Mejdi Trimeche, Tampere (FI); Marius Tico, Tampere (FI); Tom Pylkkanen, Piispanristi (FI)

(73) Assignee: Nokia Corporation, Espoo (FI)

( * ) Notice: Subject to any disclaimer, the term of this patent is extended or adjusted under 35 U.S.C. 154(b) by 350 days.

(21) Appl. No.: 11/906,990

(22) Filed: Oct. 3, 2007

(65) Prior Publication Data
US 2009/0091645 A1 Apr. 9, 2009

(51) Int. Cl.
H04N 9/73 (2006.01)
(52) U.S. Cl. .................. 348/227.1; 348/223.1
(58) Field of Classification Search ............... 348/223.1, 348/227, 1, 229
See application file for complete search history.

(56) References Cited

U.S. PATENT DOCUMENTS

| | | | |
|---|---|---|---|
| 3,971,065 A | 7/1976 | Bayer | |
| 5,801,773 A | 9/1998 | Ikeda | |
| 5,828,793 A | 10/1998 | Mann | |
| 6,433,818 B1 * | 8/2002 | Steinberg et al. | 348/161 |
| 6,765,611 B1 | 7/2004 | Gallagher et al. | |
| 6,864,916 B1 | 3/2005 | Nayar et al. | |
| 6,943,831 B2 | 9/2005 | Gallagher et al. | |
| 2002/0130957 A1 | 9/2002 | Gallagher et al. | |
| 2005/0036041 A1 | 2/2005 | Gallagher et al. | |
| 2005/0045980 A1 | 3/2005 | Guidash | 257/432 |
| 2005/0264675 A1 * | 12/2005 | Enomoto | 348/340 |
| 2006/0139470 A1 | 6/2006 | McGowan | 348/294 |
| 2006/0192873 A1 | 8/2006 | Yaffe | 348/297 |
| 2006/0250515 A1 * | 11/2006 | Koseki et al. | 348/362 |

FOREIGN PATENT DOCUMENTS

| | | |
|---|---|---|
| EP | 1 227 661 A2 | 7/2002 |
| EP | 1 209 919 A3 | 9/2004 |
| WO | 2006/036668 A2 | 4/2006 |

OTHER PUBLICATIONS

Notification of transmittal of ISR and Written Opinion of ISA mailed Dec. 23, 2008, Form PCT/ISA/220 (3 pages), International Search Report, Form PCT/ISA/210 (4 pages), Written Opinion of the ISA, Form PCT/ISA/237 (9 pages), taken from corresponding International Application PCT/IB2008/002525, filed Sep. 26, 2008.
IEEE Journal of Solid-State Circuits, vol. 34, No. 12 Dec. 1999.
IEEE 0-7803-5467-2/99 1999.
U.S. Appl. No. 11/640,529, filed Dec. 15, 2006 Marius Tico, Mejdi Trimeche and Tom Pylkkanen.
IEEE Journal of Solid-State Circuits, vol. 34, No. 12, Dec. 1999.
SIGGRAPH'97 Conference Proceedings, Aug. 1997.
IEEE P802.11-05/1095r5 Jan. 2006.
IEEE P802.11n/D1.0 Mar. 2006.

* cited by examiner

Primary Examiner — Kelly L Jerabek (57) ABSTRACT

The specification and drawings present a new method, apparatus and software product for enhancing a dynamic range of an image with a multi-exposure pixel pattern taken by an image sensor of a camera for one or more color channels, wherein a plurality of groups of pixels of the image sensor have different exposure times (e.g., pre-selected or adjusted by a user through a user interface using a viewfinder feedback, or adjusted by a user through a user interface after taking and storing RAW image, etc.). Processing of the captured image for constructing an enhanced image of the image for each of the one or more color channels can be performed using weighted combination of exposure times of pixels having different pre-selected exposure times according to a predetermined criterion.

19 Claims, 4 Drawing Sheets

MULTI-EXPOSURE PATTERN FOR ENHANCING DYNAMIC RANGE OF IMAGES

TECHNICAL FIELD

The present invention relates generally to cameras or electronic devices comprising cameras and, more specifically, to enhancing a dynamic range of images taken by the camera using a multi-exposure pixel pattern.

BACKGROUND ART

The human visual system is capable of remarkable dynamic range that enables it to detect a wide range brightness levels ($\sim 10^{10}$) from direct sunlight to dark shadows, and doing so adaptively. On the other hand, typical digital cameras provide only 8 bits, or 256 levels of brightness. Besides this reduced numeric dynamic range, the effective dynamic range is often less than that, since the pixel values are artificially gained (by analog or digital means) to enable representation of the scene within the required numeric range. This gaining operation results in the loss of granularity and increased noise levels in the recorded images and cannot recover the intrinsic loss of dynamic range due to poor pixel sensitivity. In fact, the ongoing miniaturization in the pixel size (e.g., less than 2×2 microns) can also result in reduced sensitivity which cannot be easily compensated. Thus, the intrinsic dynamic range is limited by at least the following factors:

- the reduced light sensitivity of the sensor due to limited photon conversion efficiency and non-linearity of the response functions;
- miniaturization of the pixel size: since the capacitance of semiconductor is proportional to the pixel area, there is an unavoidable trade-off between the pixel size and the associated light sensitivity; and
- the need for longer integration times in order to acquire better pictures in low light conditions which may result in having image areas that are under-exposed and other areas that are saturated.

From the user perspective, enhanced dynamic range imaging can have significant impact on perception of picture quality, especially because casual users are unaware of necessary lightening requirements to achieve proper photography results. Therefore, techniques to improve the intrinsic dynamic range will be highly valuable in the context of mobile imaging.

Most image sensors use the same exposure time for all pixels. Often, this results in images being too dark in some image areas and possibly saturated in other areas. In fact, the exposure control mechanism of the camera has to statistically determine a common exposure interval (for all pixels): this is usually done by choosing a value that suitable for the majority of the pixels, thus sacrificing either those areas that are too dark or too bright, i.e., causing degradation as a reduced intrinsic dynamic range.

The most evident prior art method (e.g., Debevec and J. Malik. Recovering High Dynamic Range Radiance Maps from Photographs. In SIGGRAPH 97, August 1997) is to enhance the intrinsic dynamic range by capturing several images at multiple exposures and then combining these images in order to improve the perceived dynamic range. However, this can be done primarily for static scenes, and in this approach it is difficult to obtain reliable results due to the unavoidable registration that is needed to map the pixels from the different images. The precise image registration remains a challenging algorithmic aspect. Other approaches are also tried.

For example, (see U.S. Pat. No. 5,801,773, E. Ikeda, Image data processing apparatus for processing combined image signals in order to extend dynamic range, 1998), multiple copies of the image are taken simultaneously using beam splitters that reflect the incoming light onto different sensors that are preset to sample the light at different exposures. This approach has the advantage of not requiring online registration since the images are captured simultaneously, however it is relatively more expensive since it requires additional image sensors and a careful alignment of the optical elements.

Another approach is based on differently exposed pixels within the same CMOS sensor has been proposed by D. Yang, B. Fowler, A. El Gamal and H. Tian, "A 640×512 CMOS Image Sensor with Ultrawide Dynamic Range Floating-Point Pixel-Level ADC," IEEE Journal of Solid State Circuits, Vol. 34, No. 12, pp. 1821-1834, December 1999. In this approach the number and timing of the exposures as well as the number of bits obtained from each pixel can be freely selected and read out. However, this requires monitoring of each image pixel in order to decide whether its exposure should be terminated or not. Additionally, the fuzzy exposure mechanism can result in incoherent noise levels across the image plane, i.e., some pixels will turn out to be noisier than the others with no reliable filtering mechanism to reduce this noise.

DISCLOSURE OF THE INVENTION

According to a first aspect of the invention, a method comprises: capturing an image with a multi-exposure pixel pattern by an image sensor of a camera for one or more color channels, wherein a plurality of groups of pixels of the image sensor have different exposure times; separating the image, for each color of the one or more color channels and for each exposure time of the different exposure times, into sub-images comprising pixels with exposure values only for one exposure time of the different exposure times and pixels with missing exposure values for exposure times different from the one exposure time; interpolating exposure values for the pixels with missing exposure values in each sub-image of the sub-images using a predetermined algorithm for providing interpolated images of the sub-images; and combining the interpolated images for each of the one or more color channels according to a predetermined criterion to provide an enhanced image of the image for each of the one or more color channels for enhancing a dynamic range of the image.

According further to the first aspect of the invention, the different exposure times may be selected through a user interface of an electronic device comprising the camera.

Further according to the first aspect of the invention, the method may further comprise: recombining the enhanced images for color channels of the one or more color channels using the multi-exposure pixel pattern for providing a recombined image with a high dynamic range of the image, wherein a number of the one or more color channels is two or more. Further still, the method may further comprise: displaying the recombined image on a viewfinder of the camera; and adjusting the different exposure times through a user interface using the recombined image displayed on the viewfinder as a feedback for optimizing the dynamic range of the recombined image.

According yet further to the first aspect of the invention, after the capturing of the image and before the separating of the image, the different exposure times of the image may be adjusted through a user interface using a pre-selected processing procedure.

According still further to the first aspect of the invention, the image may be a Bayer image.

According further still to the first aspect of the invention, the plurality of the groups of the pixels may comprise three groups of the pixels with three different exposure times.

According yet further still to the first aspect of the invention, the interpolating may be performed by calculating an interpolating value for each pixel of the pixels with missing exposure values using exposure values of one or more neighboring pixels of the each pixel.

Yet still further according to the first aspect of the invention, the combining of the interpolated images may be performed using weight coefficients for the pixels with exposure values and for the pixels with interpolated exposure values for the pixels with missing exposure values, the weight coefficients being selected using the predetermined criterion. Yet further, the weight coefficients may be higher for pixels with longer exposure values in dark image areas and for pixels with shorter exposure values in brighter image areas.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by a component or a combination of components of the camera or of an electronic device comprising the camera.

According to a third aspect of the invention, an apparatus, comprises: an image sensor of a camera, configured to capture an image with a multi-exposure pixel pattern for one or more color channels, wherein a plurality of groups of pixels of the image sensor have different exposure times; a color/exposure separator, configured to separate the image, for each color of the one or more color channels and for each exposure time of the different exposure times, into sub-images comprising pixels with exposure values only for one exposure time of the different exposure times and pixels with missing exposure values for exposure times different from the one exposure time; an interpolator, configured to interpolate exposure values for the pixels with missing exposure values in each sub-image of the sub-images using a predetermined algorithm for providing interpolated images of the sub-images; and a combiner, configured to combine the interpolated images for each of the one or more color channels according to a predetermined criterion to provide enhanced images of the image for each of the one or more color channels for enhancing a dynamic range of the image.

Still yet further according to the third aspect of the invention, the color/exposure separator, the interpolator and the combiner may be parts of a processing module.

Further according to the third aspect of the invention, the apparatus may further comprise: a recombining and further processing module, configured to recombine the enhanced images for color channels of the one or more color channels using the multi-exposure pixel pattern for providing a high dynamic range of the image, wherein a number of the one or more color channels is two or more.

Still further according to the third aspect of the invention, the apparatus may further comprise: exposure pixel pattern adjustment module, configured to provide an exposure adjustment signal or a further exposure adjustment signal for adjusting the different exposure times in response to a command signal provided through a user interface of said apparatus. Still further, the apparatus may further comprise: a viewfinder configured to display the recombined image, such that the exposure pixel pattern adjustment module may be configured to provide the exposure adjustment signal in response to the command signal for adjusting the different exposure times using the recombined image displayed on the viewfinder as a feedback for optimizing the dynamic range of the recombined image.

According still further to the third aspect of the invention, an integrated circuit may comprise all or selected modules of the apparatus.

According yet further still to the third aspect of the invention, the apparatus may be an electronic device comprising the camera for wireless communications.

According further still to the third aspect of the invention, the image may be a Bayer image.

Yet still further according to the third aspect of the invention, the plurality of the groups of the pixels may comprise three groups of the pixels with three different exposure times.

Still yet further according to the third aspect of the invention, the interpolator may be configured to interpolate the exposure values for the pixels with the missing exposure values by calculating an interpolating value for each pixel of the pixels with missing exposure values using exposure values of one or more neighboring pixels of the each pixel.

Still further still according to the third aspect of the invention, the combiner may be configured to combine the interpolated images using weight coefficients for the pixels with exposure values and for the pixels with interpolated exposure values for the pixels with missing exposure values, the weight coefficients being selected using the predetermined criterion.

Still yet further still according to the third aspect of the invention, the image sensor may be a complimentary metal oxide semiconductor image sensor.

According to a fourth aspect of the invention, an electronic device, comprises: an image sensor, configured to capture an image with a multi-exposure pixel pattern for one or more color channels, wherein a plurality of groups of pixels of the image sensor have different exposure times; a processing module, configured to process the image for constructing an enhanced image of the image for each of the one or more color channels using weighted combination of exposure times of pixels having the different pre-selected exposure times according to a predetermined criterion for enhancing a dynamic range of the image; a recombining and further processing module, configured to recombine the enhanced images for color channels of the one or more color channels using the multi-exposure pixel pattern for providing a high dynamic range of the image, wherein a number of the one or more color channels is two or more; a viewfinder configured to display the recombined image; and an exposure pixel pattern adjustment module, configured to provide adjusting of the different exposure times through a user interface of the electronic device using the recombined image displayed on the viewfinder as a feedback for optimizing the dynamic range of the recombined image.

According further to the fourth aspect of the invention, the plurality of the groups of the pixels may comprise three groups of the pixels with three different exposure times.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new method, apparatus and software product for enhancing a dynamic range of an image with a multi-exposure pixel pattern taken by an image sensor of a camera for one or more color channels, wherein a plurality of groups of pixels of the image sensor have different exposure times (e.g., pre-selected electronically, selected by a user through a user interface, programmable, adjusted through a user interface using a viewfinder feedback, adjusted by a user through a user interface after taking and storing RAW image, etc.). According to an embodiment of the present invention, processing of the captured image for constructing an enhanced image of the image for each of the one or more color channels can be performed using weighted combination of exposure times of pixels having different exposure times according to a predetermined criterion. The camera can be a part of, e.g., an electronic device such as mobile phone or mobile cameraphone for wireless communications, or a portable electronic device in general.

According to a further embodiment of the present invention, the processing of the captured images can comprise: a) separating the image, for each color of the one or more color channels and for each exposure time of the different exposure times, into sub-images comprising pixels with exposure values only for one exposure time and pixels with missing exposure values for exposure times different from the one exposure time; b) interpolating exposure values for the pixels with missing exposure values in each sub-image of the sub-images using a predetermined algorithm for providing interpolated images of these sub-images; and c) combining these interpolated images for each of the one or more color channels according to the predetermined criterion for providing the enhanced image of the image for each of the one or more color channels.

In addition, for multi-color images, the enhanced images for different color channels can be recombined using the original multi-exposure pixel pattern for providing a high dynamic range of the multi-color image. For example, according to one embodiment, the multi-color images can be based on the legacy Bayer pattern for color sensing and the dynamic range of the captured images can be improved enabling the reconstruction of the colors in a homogeneous fashion.

Different exposure intervals for pixels can be achieved by using a CMOS (complimentary metal oxide semiconductor) image sensors where the pixels can have different exposure intervals according to a fixed geometric pattern and pre-set electronically. The pixels of different exposure times are alternating according to a specific pattern, and the exposure times can be set before the picture is taken. The repetitive geometric pattern enables to obtain different exposures in any given pixel neighborhood. When sub-sampling the image recorded by the sensor, every area in the imaged scene can be represented.

Figure 1:
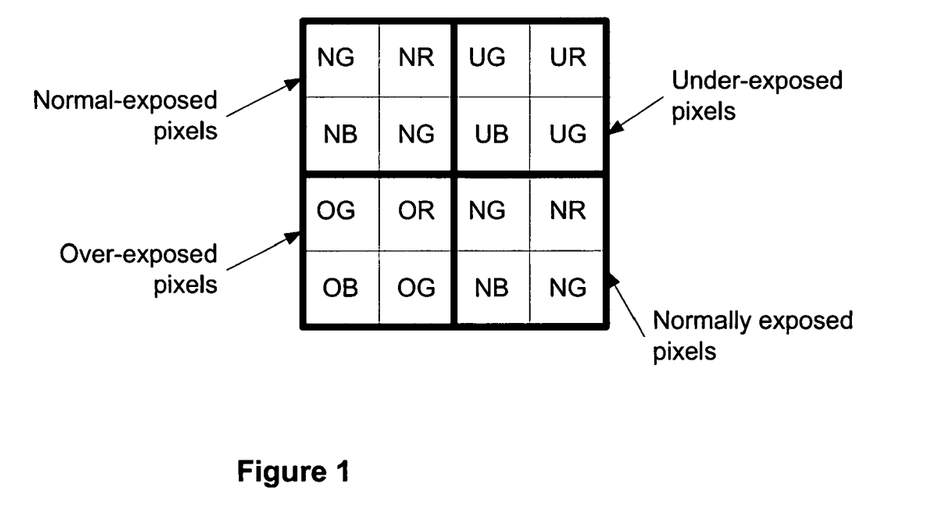
FIG. 1 is a schematic representation of a Bayer-type pixel pattern using 3 different values of exposure intervals using groups comprising of 4×4 pixels, wherein the pixels are interleaved spatially such that half of the pixels are exposed at a median exposure interval (normal-exposed pixels), a quarter of the pixels are over-exposed and a quarter of the pixels are under-exposed, according to embodiments of the present invention.

Many pixel patterns with different exposure times can be used and pre-set electronically for implementing embodiments of the present invention described herein. One example among many others is shown in FIG. 1 which is a schematic representation of Bayer-type pixel pattern using 3 different values of exposure intervals using groups comprising of 4×4 pixels, wherein the pixels are interleaved spatially such that half of the pixels are exposed at a median exposure interval (normal-exposed pixels), a quarter of the pixels are over-exposed and a quarter of the pixels are under-exposed as shown in FIG. 1, according to one embodiments of the present invention.

According to an embodiment of the present invention, the final image can be constructed by combining the values of differently exposed pixels. This combination can be done such that to weight more the importance of longer exposed pixels in the dark image areas, and on the other hand, to weight more the shorter exposed pixel values corresponding to the brighter areas of the scene.

Figure 2:
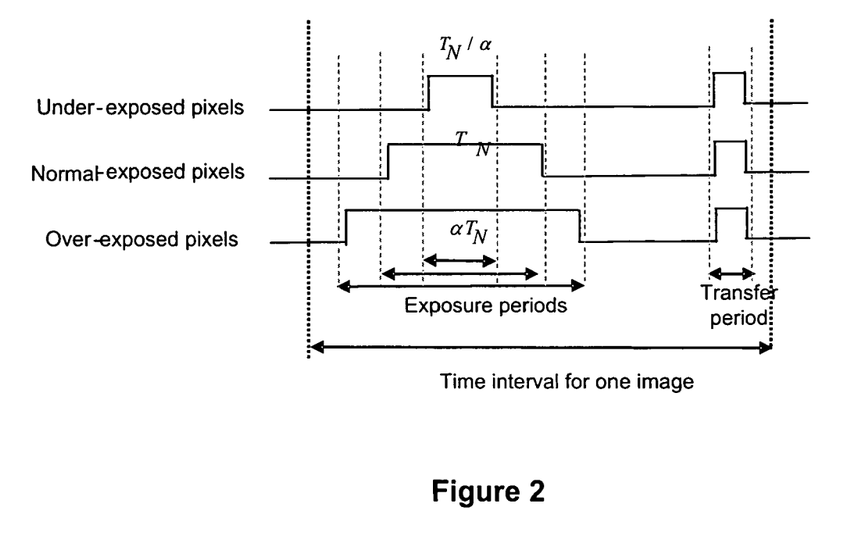
FIG. 2 is a graph demonstrating exposure times for under-exposed, normal and over-exposed groups of pixels with a parameter alpha for tuning the discrepancy between the exposure intervals, according to an embodiment of the present invention.

According still to another embodiment of to the present invention, as shown in FIG. 2 demonstrating exposure times for under-exposed, normal and over-exposed groups of pixels, the discrepancy between the multi-exposures can be controlled by varying a single parameter ($\alpha$), wherein $\alpha \geq 1$. Default operation (all the pixels in the sensor are equally exposed) can be restored by setting $\alpha=1$. A user interface mechanism (for instance a rotating wheel controlled by a user) can be used to control the "dynamic contrast" by modulating this parameter ($\alpha$) and hence the exposure of pixels in the sensor plane.

Figure 3:
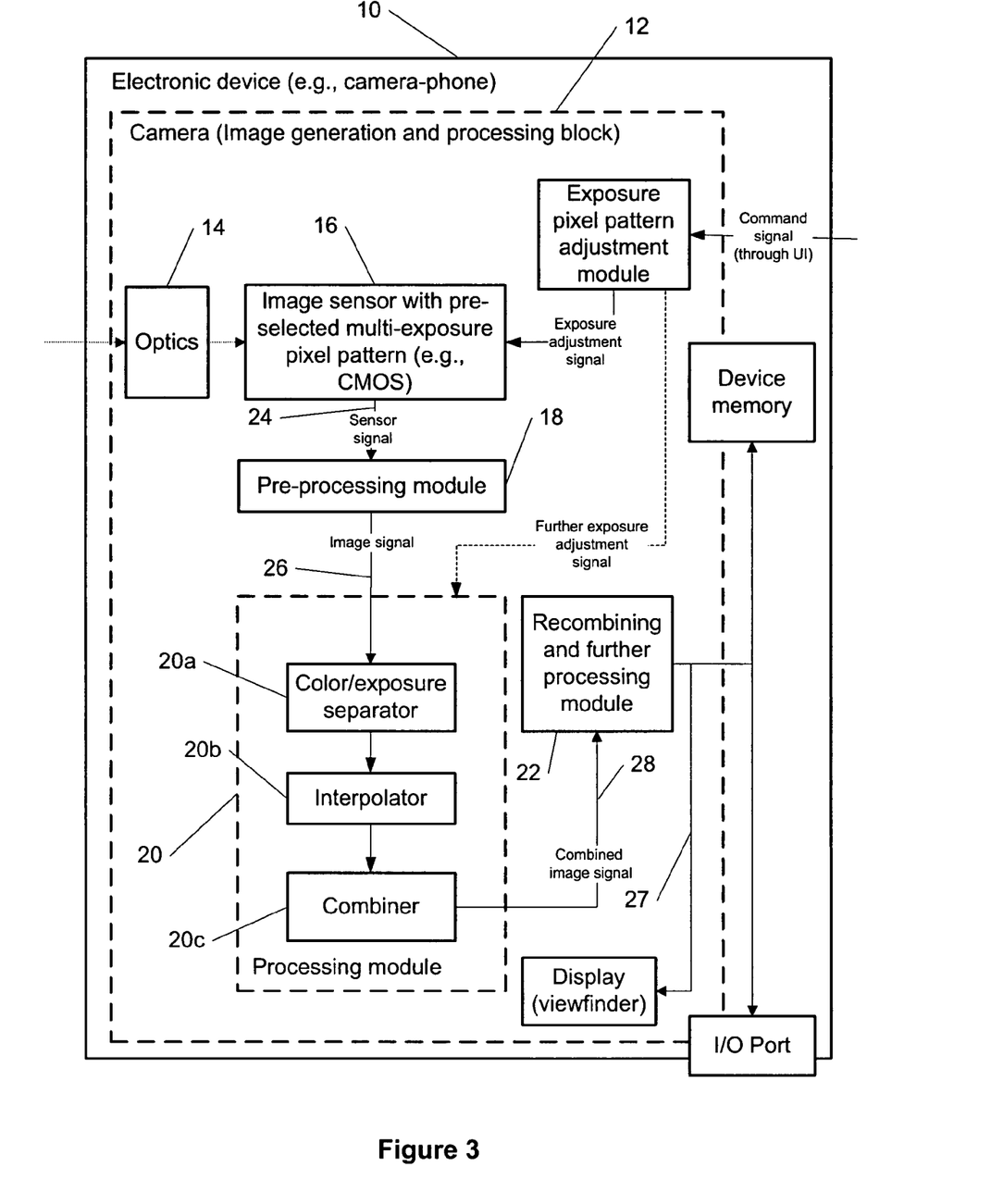
FIG. 3 is a block diagram of an electronic device comprising a camera for enhancing a dynamic range of images taken by the camera using a multi-exposure pixel pattern, according to an embodiment of the present invention.

FIG. 3 is an example among others of a block diagram of an electronic device 10 comprising a camera 12 for enhancing a dynamic range of images taken by the camera 12 using a multi-exposure pixel pattern of an image sensor 16 with exposure times for different groups of pixels (e.g., electronically), as described herein, with a multi-exposure pixel pattern for capturing images taken by the camera 12, according to an embodiment of the present invention.

The electronic device 10 can be, but is not limited to, a camera, a wireless communication device, a mobile phone, a camera-phone mobile device, a portable electronic device, non-portable electronic device, etc.

The camera 12 can comprise an optics 14 (e.g., lens, color filters, etc.) and the image sensor 16 (e.g., CMOS sensor) for capturing the image with a multi-exposure pattern for one or more color channels, as described herein, to provide a sensor signal 26. A pre-processing module 18 can perform some pre-processing including but not limited to, e.g., pedestal elimination, vignetting correction, histogram analysis, pre-set gaining, etc., and then provide an image signal 26 to a processing module 20. According to an embodiment of the present invention, the module 20 can perform the following steps: a) color/exposure separation into sub-images (by a color/exposure separator 20a), b) interpolation of sub-images according to the predetermined algorithm (by the interpolator 20b), and c) image combining for constructing the enhanced image for each color using combining interpolated sub-images with weighted combination of exposure times of pixels having different exposure times according to the predetermined criterion (by a combiner 20c), according to various embodiments described herein (e.g., see FIG. 5).

Furthermore, the module 20 can provide a combined image signal 28 for each color to a recombining and further processing module 22 to perform recombining of enhanced images of different colors according to original multi-exposure pixel pattern and then to perform standard further processing, e.g., automatic white balance (AWB), color interpolation, contrast enhancement, noise reduction, miscellaneous corrections, etc., and then can be further provided (optionally) as an output to different modules of the electronic device 10, e.g., to a display (viewfinder) for viewing, to a device memory for storing, or to an input/output (I/O) port for forwarding to a desired destination.

According to a further embodiment of the present invention, the camera 12 can further comprise an exposure pixel pattern adjustment module 25 configured to provide an exposure adjustment signal or a further exposure adjustment signal for adjusting the different exposure times, as described herein, in response to a command signal provided through a user interface by the user. The exposure adjustment signal can be provided to the image sensor 16 for selecting the appropriate different exposure times of pixels, e.g., before capturing an image. Alternatively, the recombined image (after processing described herein) can be displayed on a camera display (viewfinder), such that said exposure pixel pattern adjustment module is configured to provide adjustment of these different exposure times of pixels (using the exposure adjustment signal in response to the command signal provided through a user interface by the user) "on the fly" using this recombined image displayed on the viewfinder as a feedback for optimizing the dynamic range of the recombined image.

Furthermore, according to another embodiment of the present invention, the image can be taken with a pre-selected exposure pixel pattern (e.g., as shown in FIG. 1) and then stored in a RAW-format, (e.g., in an additional memory in processing module 20). Then the single parameter $\alpha$ (introduced in reference to FIG. 2), wherein $\alpha \geq 1$, of this captured image is stored as metadata corresponding to the RAW image and can be further adjusted by a user through a user interface to fine-tune the contrast in the final image (in response to a command signal provided by the user) using the further exposure adjustment signal provided to the processing module 20 by the module 25. This latter method for adjusting $\alpha$ can achieve similar operation to digital gaining of the image contrast, however it may cause the amplification of the noise-level in under-exposed pixels. The processing can be done, for example, by weighting the normal-exposed pixels with under-exposed and with over-exposed pixel information to provide the desired $\alpha$ value (i.e., to balance the overall brightness of the image and improve the final image quality). This adjustment of $\alpha$ of the RAW image may be performed by the processing module 20 before further processing by the modules 20a, 20b and 20c, as described herein.

According to an embodiment of the present invention, the module 18, 20, 22 or 25 can be implemented as a software or a hardware module or a combination thereof. Furthermore, the module 18, 20, 22 or 25 can be implemented as a separate module or it can be combined with any other module/block of the electronic device 10 or it can be split into several blocks according to their functionality. Moreover, it is noted that all or selected modules of the electronic device 10 can be implemented using an integrated circuit.

Figure 4:
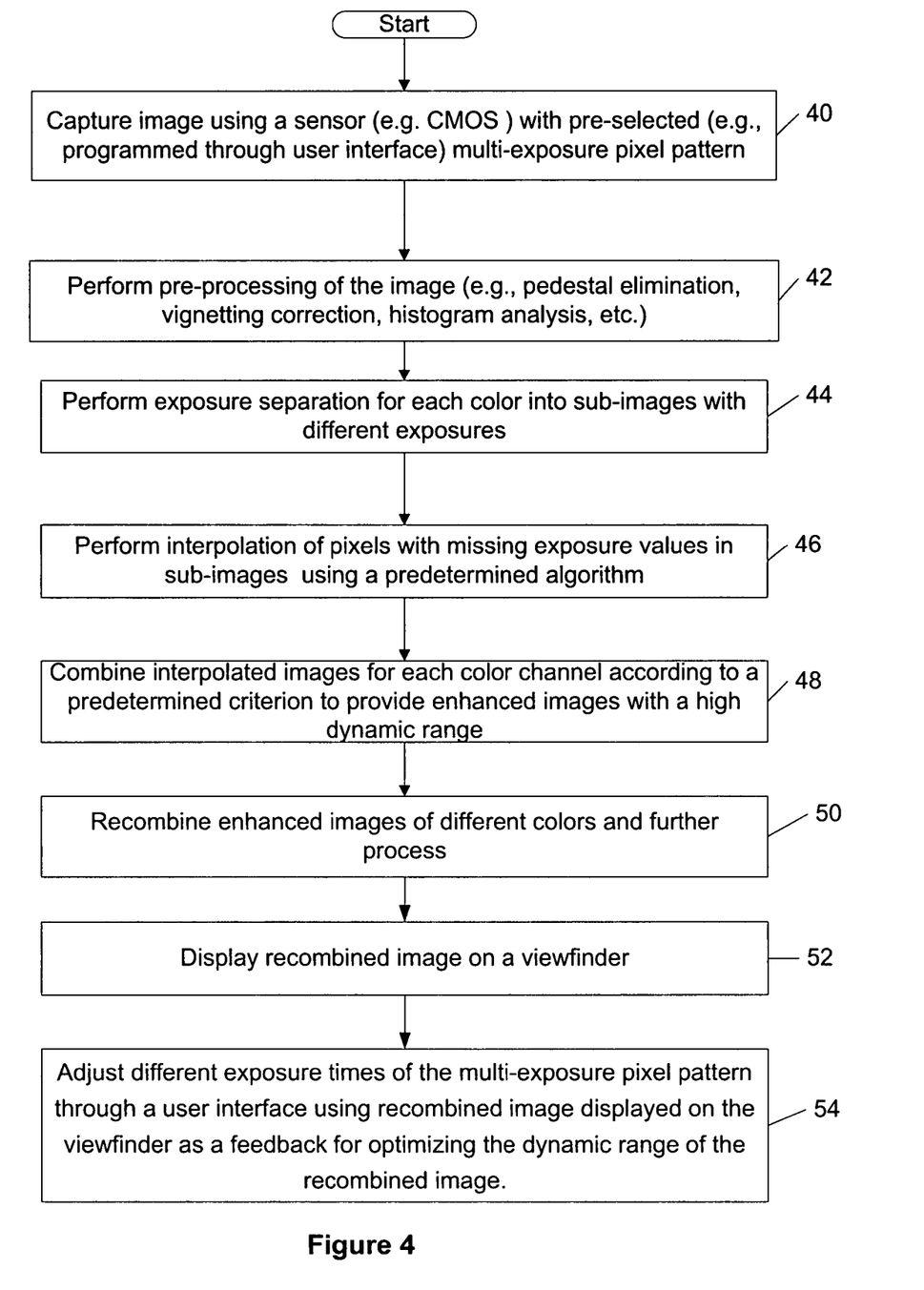
FIG. 4 is a flow chart demonstrating enhancing a dynamic range of images taken by the camera using a multi-exposure pixel pattern, according to an embodiment of the present invention.

FIG. 4 shows an example among others of a flow chart demonstrating enhancing a dynamic range of images taken by the camera using a multi-exposure pixel pattern, according to an embodiment of the present invention.

The flow chart of FIG. 4 only represents one possible scenario among others. It is noted that the order of steps shown in FIG. 4 is not absolutely required, so in principle, the various steps can be performed out of order. In a method according to the embodiment of the present invention, in a first step 40, an image is captured using a sensor (e.g., CMOS) with a multi-exposure pixel pattern for one or more color channels, as described herein. In a next step 42, pre-processing of the image (e.g., pedestal elimination, vignetting correction, histogram analysis, etc.) is performed.

In a next step 44, exposure separation for each color into sub-images with different exposures for each exposure time of different exposure times is performed, wherein sub-images comprise pixels with exposure values only for one exposure time of the different exposure times and pixels with missing exposure values for exposure times different from the one exposure time.

In a next step 46, interpolation of pixels with missing exposure values is performed in sub-images using a predetermined algorithm (see an example discussed in reference to FIG. 5) for providing interpolated images of these sub-images.

In a next step 48, interpolated images are combined for each color channel according to a predetermined criterion, e.g., using weighted combination of exposure times of pixels having different exposure times (see an example discussed in reference to FIG. 5) to provide enhanced images with a high dynamic range, as described herein.

In a next step 50, the enhanced images of different colors are recombined and further processed (e.g., automatic white balance (AWB), color interpolation, contrast enhancement, noise reduction, miscellaneous corrections, etc.). In a next step 52, the recombined image can be displayed on a viewfinder of the camera. In a next step 54, the different exposure times of the multi-exposure pixel pattern may be adjusted through a user interface using recombined image displayed on the viewfinder as a feedback for optimizing the dynamic range of the recombined image.

Figure 5:
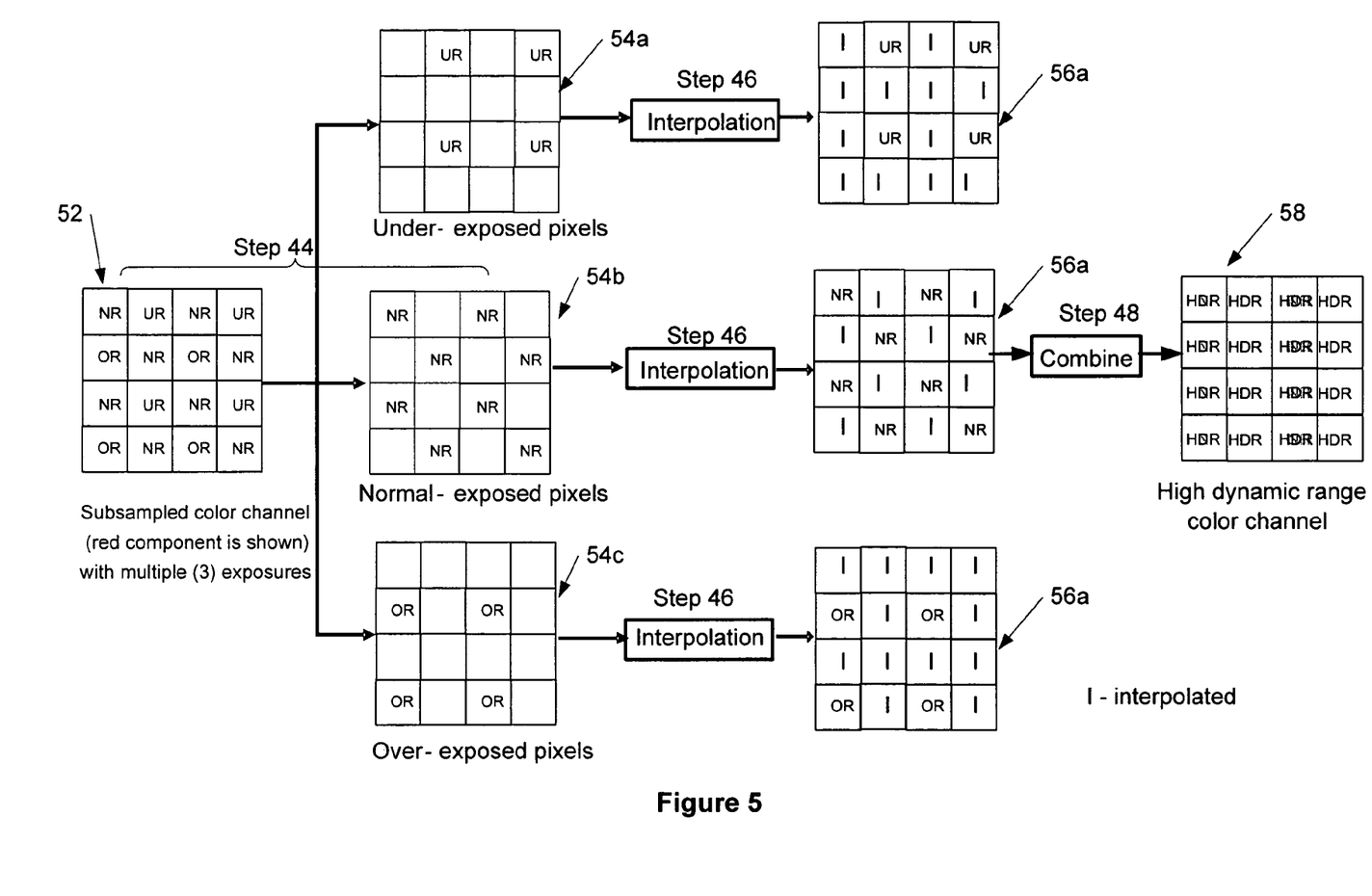
FIG. 5 is a flow diagram demonstrating an example for implementing steps 44-48 of the flow chart of FIG. 4 for red color, according to an embodiment of the present invention.

FIG. 5 shows a flow diagram demonstrating one example among others for implementing steps 44-48 of the flow chart of FIG. 4 for one color (e.g., red color) for a Bayer pattern shown in FIG. 1, according to an embodiment of the present invention.

Step 44 (as shown in FIG. 5 for the red color channel) corresponds to separating the captured image into sub-images for the different color channels (R, G, B, G for the Example of FIG. 1). Each sub-image corresponds to a single spectral channel and includes pixels at 3 different exposures: each group of 4 pixels contains 1 under-exposed pixel, 2 normally exposed pixels and 1 over-exposed pixel, as indicated in FIG. 1. Then the, sub-image 52 for red color is further separated into sub-images 54a, 54b and 54c corresponding to under-exposed, normal-exposed and over-exposed pixels, respectively.

Step 46 corresponds to interpolating the missing exposure values in the sub-images 54a, 54b and 54c. This step is based on the fact that each pixel of the sensor captures only the visual information with a fixed exposure time, however, the spatial arrangement of different exposures in the sensors ensures the presence of all exposure times in a certain neighbourhood of each pixel. Consequently, the visual information corresponding to the missing exposure times in each pixel can be estimated by interpolating the values of its neighbouring pixels. Specifically, given three exposure times $T_k$, for k=1, 2, 3, a number of three values are needed in each pixel (i, j), i.e. $v_1(i, j)$, $v_2(i, j)$, and $v_3(i, j)$. Among these values one is directly measured in the pixel, whereas the other two are estimated by interpolating the corresponding exposed values of the neighboring pixels (e.g., of the sub-image 52) There are many ways to do this interpolation and we do not limit to any one of them. A simple implementation can rely on a linear interpolation. For example, in sub-image 54a, the zero order interpolation can be performed by replicating the under-exposed pixels (UR) into the neighboring 3 missing pixels to the left and down of the original pixel position; in sub-image 54b, the zero order interpolation can be performed by replicating the normal-exposed pixels (NR) towards the adjacent missing pixel to the right of the original position; and in sub-mage 54c, the zero order interpolation can be performed by replicating the over-exposed pixels (OR) into the neighboring missing 3 pixel positions to the right and above the original pixel position.

Other types of interpolation could be used as well. For example the linear interpolation of sub-images 54a, 54b and 54c can be performed by fitting a surface onto the image grids with corresponding initial surface height defined by the available sensed pixels. The missing pixel values can be calculated by first defining a window of influence containing the neighboring samples that would contribute to the missing sample. The distance between each of the contributing samples and the center of the pixel of interest is calculated. The weight assigned to each of the neighboring pixels can be inversely proportional to its distance from the pixel of interest (the sum of weights is adjusted to be equal to 1). The final pixel value can be calculated as the weighted sum of the contributing neighboring pixel values. Additionally, known techniques for color interpolation from Bayer pattern can be adapted to perform this task. Thus, interpolated images 56a, 56b and 56c are constructed as shown in FIG. 5.

Step 48 corresponds to combining the resulted multiple interpolated images in order to obtain a high dynamic range image 58 of the scene. This step is based is the operation that enables the imaging system to enhance its dynamic range, meaning that the different exposures that were sampled at the image sensor are to be combined such as to optimally map the scene dynamic range into the dynamic range of the imaging device. In this step, the algorithm combines the visual information of different exposure times present in each pixel such that to obtain an extended dynamic range image. This combination can be done in various ways, among which we can choose a weighted average of the pixel values at different exposures.

For example, for each pixel (i, j), the three exposed values $v_1(i, j)$, $v_2(i, j)$, and $v_3(i, j)$ can be combined to form the final output f(i, j) as follows:

$$f(i, j) = T \frac{\sum_{k=1}^{3} T_k w_k(i, j) v_k(i, j)}{\sum_{k=1}^{3} T_k w_k(i, j)},$$

wherein f(i, j) denotes the pixel value in the final image, $T_k$ denotes the k-th exposure time, and T is a gain value, which theoretically corresponds to the simulated exposure time of a sensor with an extended dynamic range capability. The value $w_k(i, j)$ is a weight value associated with the k-th exposure of the pixel (i, j). The weight value can be selected in many ways but generally it emphasizes the pixels in the middle range which are neither saturated nor strongly underexposed. In addition to that the two values of each pixel that are not directly measured in the pixel but rather obtained through interpolation as shown in step 46 of the algorithm can be also weighted less. The exposure times present in the formula emphasize more the longer exposed pixels since they are less noisy.

According to a further embodiment of the present invention, additional filtering operations can be inserted between steps 44 and 46 to further improve the image quality. A first operation that may be inserted between steps 44 and 46 is applying preset digital gaining of the over-exposed and under-exposed interpolated images (56a and 56c) to correspond to the median (or default) exposure value that is used for instance in the interpolated image 56b. For instance, the preset gaining can be parameterized using α value in order to equalize the average brightness across the captured image. The gaining shall be performed such as to extend the number of bits read from the sensor; for example if the sensor provides 10-bit reading, then all the components shall be gained accordingly to 12-bit precision.

Furthermore, another filtering operation that may be inserted between steps 44 and 46 is applying noise filters to each of the interpolated images 56a, 56b and 56c separately. The noise filters shall be tuned by the corresponding exposure value meaning for example that the under-exposed interpolated image 56a will be characterised by a lower signal to noise ratio (SNR) than 56b and 56c and hence shall be filtered more aggressively to reduce the noise artifacts, whereas the over-exposed interpolated image 56c (if not saturated) will be characterized by the highest signal to noise ratio (SNR) and hence shall be preserved accordingly. This step for exposure-adaptive noise filtering, e.g., can be implemented by linear filters and the corresponding filter coefficients can be retrieved from a look-up table that is modulated by the exposure value.

It should be noted that due to the proposed sensing pattern which alternates different exposures in any given pixel neighborhood, the intrinsic spatial resolution of the images recorded by the sensor may be reduced. This corresponds to a trade-off between spatial resolution (pixel density) and dynamic resolutions (contrast resolving capability). However, for the video output this trade-off is not valid because the video output resolution is usually much smaller than the sensor resolution. Additionally, even for still image capture, users might be willingly opting to improve contrast, for instance when they choose to use a night mode.

It is further noted that extending the dynamic range, as described herein, can save computational resources because it does not require image registration like most of existing approaches. This can also significantly improve the robustness of the derived solutions by eliminating the risk of miss-alignment of the input images. Moreover, improving dynamic range for the video output can be accomplished without significant loss in spatial resolution, since the video is usually down-sampled anyway. Furthermore, according to one embodiment described herein, the possibility exists for switching between high dynamic range functionality (different pixel exposures) and normal functionality (uniform pixel exposures) of the image sensor, which is not done before.

It is further noted, that the sensing pattern and corresponding reconstruction method, described herein, does not affect the entire image formation pipeline. It can be easily plugged in any existing camera reconstruction chain by inserting few functions at the initial processing stages, and does not require to re-engineer the entire imaging platform. Moreover, a potential exists for delivering a less noisy and/or blurry picture by exploiting the availability of shorter and longer exposure information.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
    separating an image, captured with an image sensor with a multi-exposure pixel pattern for one or more color channels with a plurality of groups of pixels of said image sensor having different exposure times, for each color of said one or more color channels and for each exposure time of said different exposure times, into sub-images comprising pixels with exposure values only for one exposure time of said different exposure times and pixels with missing exposure values for exposure times different from said one exposure time;
    interpolating exposure values for said pixels with missing exposure values in each sub-image of said sub-images using a predetermined algorithm for providing interpolated images of said sub-images; combining said interpolated images for each of said one or more color channels according to a predetermined criterion to provide an enhanced image of said image for each of said one or more color channels for enhancing a dynamic range of said image;
    recombining said enhanced images for color channels of said one or more color channels using said multi-exposure pixel pattern for providing a recombined image with a high dynamic range of said image, wherein a number of said one or more color channels is two or more;
    displaying said recombined image on a viewfinder; and
    adjusting said different exposure times through a user interface using said recombined image displayed on said viewfinder as a feedback for optimizing said dynamic range of said recombined image, wherein said different exposure times adjusted through the user interface include a normal-exposure period, an under-exposure period, and an over-exposure period, wherein said adjusting comprises adjusting a parameter to a value of greater than or equal to one, wherein the normal-exposure period multiplied by the adjusted parameter value determines the over-exposure period and the normal-exposure period divided by the adjusted parameter value determines the under-exposure period.

2. The method of claim 1, wherein after said capturing said image and before said separating of said image, said different exposure times of said image are adjusted through the user interface using a pre-selected processing procedure.

3. The method of claim 1, wherein said image is a Bayer image.

4. The method of claim 1, wherein said plurality of the groups of said pixels comprises three groups of said pixels with three different exposure times.

5. The method of claim 1, wherein said interpolating is performed by calculating an interpolating value for each pixel of said pixels with missing exposure values using exposure values of one or more neighboring pixels of said each pixel.

6. The method of claim 1, wherein said combining of said interpolated images is performed using weight coefficients for said pixels with exposure values and for said pixels with interpolated exposure values for said pixels with missing exposure values, said weight coefficients being selected using said predetermined criterion.

7. The method of claim 6, wherein said weight coefficients are higher for pixels with longer exposure values in dark image areas and for pixels with shorter exposure values in brighter image areas.

8. A computer program product comprising: a non-transitory computer readable storage structure embodying a computer program code thereon for execution by a computer processor with said computer program code, wherein said computer program code comprises instructions for performing the method of claim 1.

9. An apparatus, comprising:
    a color/exposure separator, configured to separate an image, captured with an image sensor with a multi-exposure pixel pattern for one or more color channels with a plurality of groups of pixels of said image sensor having different exposure times, for each color of said one or more color channels and for each exposure time of said different exposure times, into sub-images comprising pixels with exposure values only for one exposure time of said different exposure times and pixels with missing exposure values for exposure times different from said one exposure time;
    an interpolator, configured to interpolate exposure values for said pixels with missing exposure values in each sub-image of said sub-images using a predetermined algorithm for providing interpolated images of said sub-images; and
    a combiner, configured to combine said interpolated images for each of said one or more color channels according to a predetermined criterion to provide enhanced images of said image for each of said one or more color channels for enhancing a dynamic range of said;
    a recombining and further processing module, configured to recombine said enhanced images for color channels of said one or more color channels using said multi-exposure pixel pattern for providing a high dynamic range of said image, wherein a number of said one or more color channels is two or more;
    an exposure pixel pattern adjustment module, configured to provide an exposure adjustment signal or a further exposure adjustment signal for adjusting said different exposure times in response to a command signal provided through a user interface of said apparatus; and
    a viewfinder configured to display said recombined image, such that said exposure pixel pattern adjustment module is configured to provide the exposure adjustment signal in response to said command signal for adjusting said different exposure times using said recombined image displayed on said viewfinder as a feedback for optimizing said dynamic range of said recombined image, wherein said different exposure times include a normal-exposure time, an under-exposure time, and an over-exposure time, wherein said adjusting comprises adjusting a parameter to a value of greater than or equal to one, wherein the normal-exposure time multiplied by the adjusted parameter value determines the over-exposure time and the normal-exposure time divided by the adjusted parameter value determines the under-exposure time.

10. The apparatus of claim 9, wherein an integrated circuit comprises all or selected modules of said apparatus.

11. The apparatus of claim 9, wherein said apparatus is an electronic device comprising said sensor for wireless communications.

12. The apparatus of claim 9, wherein said image is a Bayer image.

13. The apparatus of claim 9, wherein said plurality of the groups of said pixels comprises three groups of said pixels with three different exposure times.

14. The apparatus of claim 9, wherein said interpolator is configured to interpolate said exposure values for said pixels with the missing exposure values by calculating an interpolating value for each pixel of said pixels with missing exposure values using exposure values of one or more neighboring pixels of said each pixel.

15. The apparatus of claim 9, wherein said combiner is configured to combine said interpolated images using weight coefficients for said pixels with exposure values and for said pixels with interpolated exposure values for said pixels with missing exposure values, said weight coefficients being selected using said predetermined criterion.

16. The apparatus of claim 9, wherein said image sensor is a complimentary metal oxide semiconductor image sensor.

17. The apparatus of claim 9, comprising said image sensor.

18. An electronic device, comprising:
an image sensor, configured to capture an image with a multi-exposure pixel pattern for one or more color channels, wherein a plurality of groups of pixels of said image sensor have different exposure times;
a processing module, configured to
process said image for constructing an enhanced image of said image for each of said one or more color channels using weighted combination of exposure times of pixels having said different pre-selected exposure times according to a predetermined criterion for enhancing a dynamic range of said image; and configured to
recombine said enhanced images for color channels of said one or more color channels using said multi-exposure pixel pattern for providing a high dynamic range of said image, wherein a number of said one or more color channels is two or more;
a viewfinder configured to display said recombined image; and
an exposure pixel pattern adjustment module, configured to provide adjusting of said different exposure times through a user interface of said electronic device using said recombined image displayed on said viewfinder as a feedback for optimizing said dynamic range of said recombined image, said different exposure times including a normal-exposure time, an under-exposure time, and an over-exposure time, said adjusting comprising adjusting a single parameter to a value of greater than one, wherein the normal-exposure time multiplied by the adjusted parameter value determines the over-exposure time and the normal-exposure time divided by the adjusted parameter value determines the under-exposure time.

19. The electronic device of claim 18, wherein said plurality of the groups of said pixels comprises three groups of said pixels with three different exposure times.

* * * * *